July 9, 1968
A. NICOLE ET AL
3,391,773
PROPORTIONAL SPACING EMBOSSING TOOL
Filed Nov. 14, 1966
4 Sheets-Sheet 1
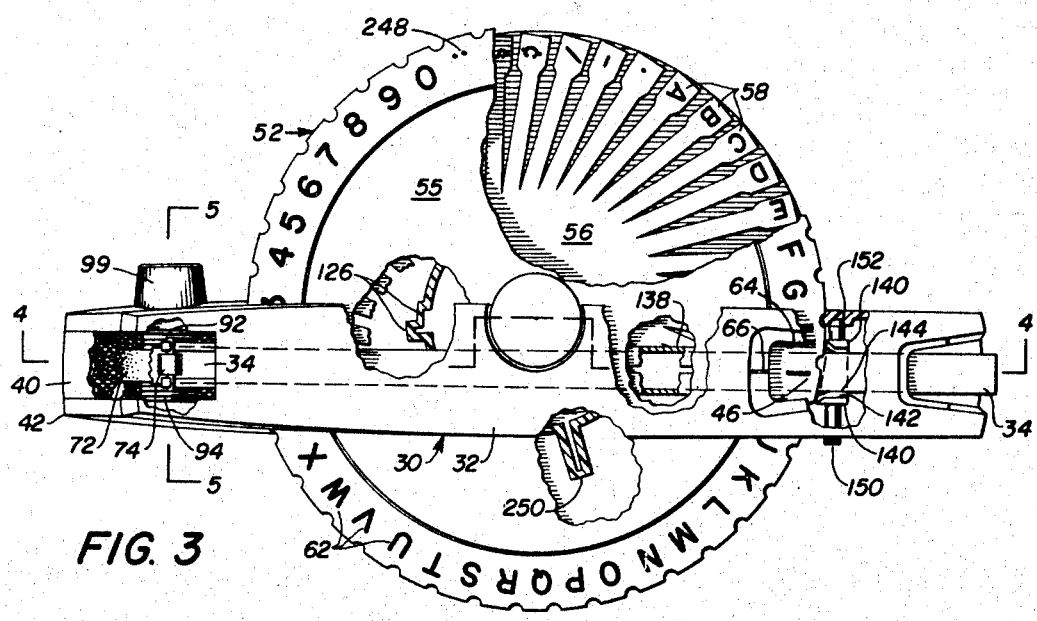
FIG. 3
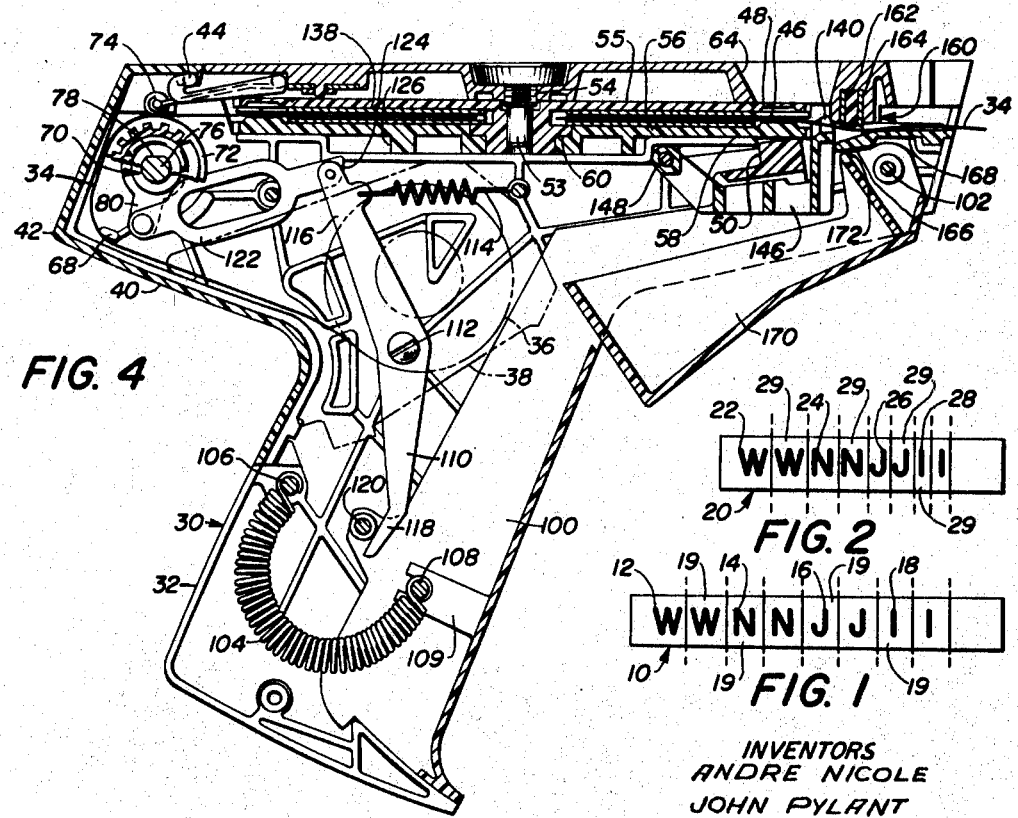
FIG. 4
FIG. 2
FIG. 1
INVENTORS
ANDRE NICOLE
JOHN PYLANT
BY
SAMUELSON AND JACOB
THEIR ATTORNEYS

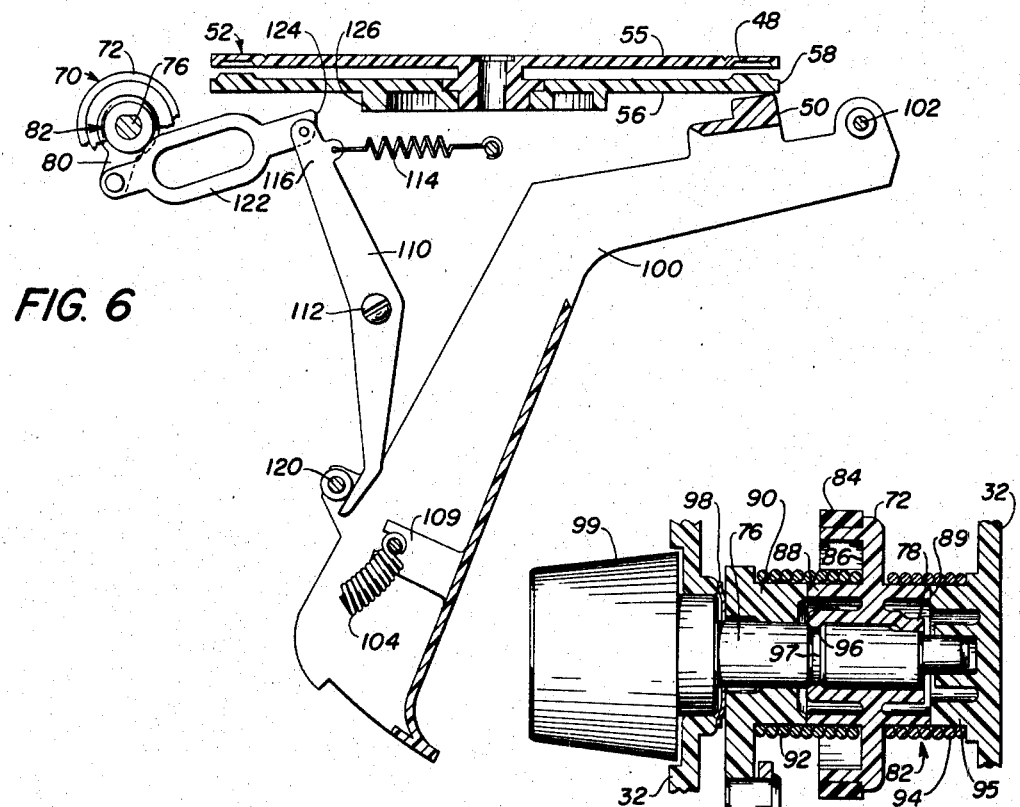
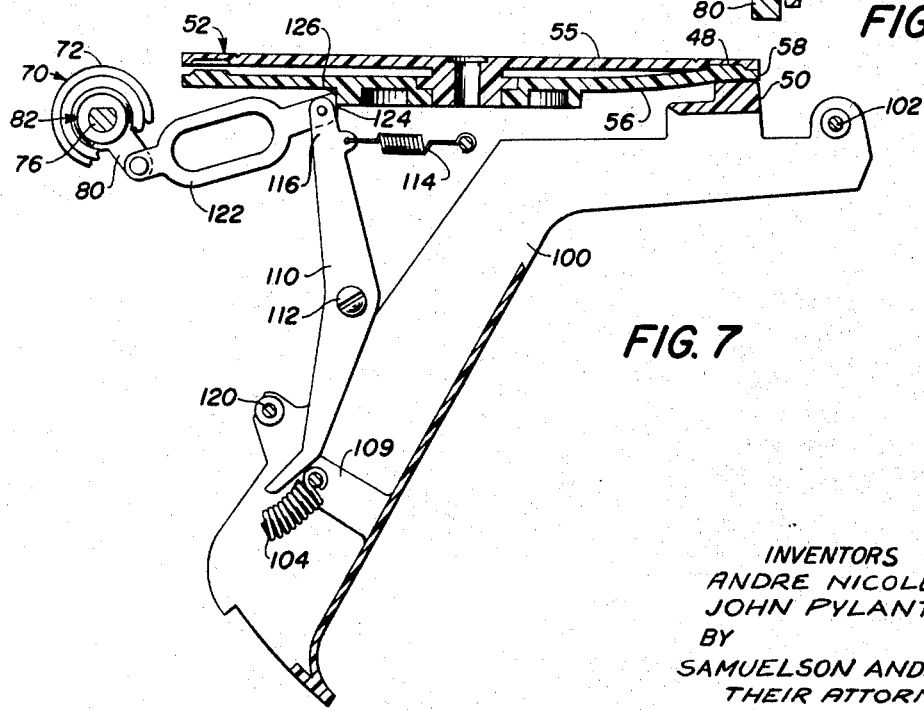

United States Patent Office 3,391,773
Patented July 9, 1968

3,391,773
PROPORTIONAL SPACING EMBOSSING TOOL
Andre Nicole, San Francisco, and John Pylant, Northridge, Calif., assignors to Dymo Industries, Inc., Emeryville, Calif., a corporation of California
Filed Nov. 14, 1966, Ser. No. 594,157
19 Claims. (Cl. 197—6.7)

ABSTRACT OF THE DISCLOSURE

An embossing tool for embossing a series of characters of various dimensions along the length of an elongate strip of embossable material, the centers of adjacent characters being spaced from one another longitudinally in proportion to the maximum longitudinal dimensions of the adjacent characters, the tool including a body with an embossing station, a plurality of embossing die sets carried by a selector wheel so that any one die set may be located at the embossing station, an actuating handle, a feed roll mounted for rotation in the body for gripping and advancing the strip in prescribed increments corresponding to the amount of rotation of the feed roll so as to locate successive areas of predetermined lengths of the strip at the embossing station in response to movement of the actuating handle, a carrier arm mounted for reciprocating movement in response to movement of the actuating handle, a sensing member carried by the carrier arm for reciprocating movement, a plurality of stops corresponding to the plurality of embossing die sets, any one of the stops being located in the path of the sensing member when a corresponding die set is located at the embossing station to engage the sensing member and preclude the travel of the carrier arm beyond the position where the sensing member contacts the stop, means in the form of a pawl and ratchet mechanism or another clutch device coupling the carrier arm with the feed roll such that the increment of advancement of the strip corresponds to the limited travel of the carrier arm allowed by the stop, the limited travel and the concomitant increment being in proportion to the maximum longitudinal dimension of the character embossed by the die set at the embossing station, and registration means for locating each area of the strip relative to the die set at the embossing station such that the center of the character to be embossed within that area coincides with the center of the area and the centers of adjacent characters in the series of embossed characters will be spaced from one another in proportion to the maximum longitudinal dimensions of the adjacent characters.

In the specification

The present invention relates generally to embossing tools for embossing indicia upon strip material and pertains, more specifically, to such tools wherein a series of embossed indicia or characters are spaced relative to one another along the strip in proportion to the dimensions of the individual characters to obtain an evenly spaced appearance in any series of embossed characters.

A variety of embossing tools is presently available for establishing embossments in strips of embossable material in the fabrication of labels, signs, plates, tags and like embossed articles. More recently, such tools have been developed for embossing various indicia on thin plastic strips formed of sheeted thermoplastic synthetic resins which are capable of being cold-formed to establish a contrast color relief enfigurement therein.

Usually, the tools employ embossing means for establishing the desired embossments or characters, a supply of strip material and means for feeding the strip material from the supply to the embossing means. The strip material is generally in the form of an elongated flexible tape. Ordinarily, the embossing means are actuated by the operation of an operator means and the feed means are actuated in response to operation of the operator means to advance the strip material through predetermined increments of advancement. The increments are usually fixed at a constant amount for every character and are great enough to accommodate the character of greatest width or similar dimension along the direction of advancement or feed and the spacing between the centers of adjacent characters is equal for all characters. Since this spacing between centers is equal and the widths of the characters are unequal, the space between characters varies and gives rise to an uneven appearance in a series of embossed characters.

Recognizing that aesthetically more pleasing embossed articles can be fabricated by spacing the embossed characters thereon in proportion to their width, i.e., less distance between the centers of characters in a series including at least one character of lesser width than between centers of characters of greater width, the invention has for an important object the provision of means in a relatively simple and inexpensive embossing tool for regulating the spacing between adjacent characters embossed in a strip of embossable material so that the centers of characters in any series of characters of various widths embossed upon a strip of material will be spaced from one another in proportion to the various widths of such characters.

Another object of the invention is to provide an embossing tool which is capable of embossing a series of characters of different dimensions upon a strip of embossable material and which will space the characters along the strip in proportion to the dimensions of the characters in response to actuation of the tool in a now conventional manner.

Still another object of the invention is to provide a novel clutch mechanism particularly well suited for use in connection with feed means in a tool of the type described above wherein an infinite variation is permitted in the length of the increment of advancement of the strip of material in response to actuation of the tool.

A further object of the invention is to provide an embossing tool which can emboss more than one character within a given area of a strip of embossable material without advancement of the strip between the embossing of such multiple characters so as to enable the embossing of accent marks, composite characters and the like without requiring retraction of the strip between embossing operations.

A still further object of the invention is to provide an embossing tool having a limited number of component parts and having a simplified construction which is readily manufactured and easily assembled.

The above objects, as well as further objects and advantages are attained by the invention which may be described briefly as an embossing tool for embossing a series of characters of various dimensions along the length of an elongated strip of embossable material of predetermined width, the centers of adjacent characters being spaced from one another longitudinally in proportion to the maximum longitudinal dimensions of the adjacent characters, the tool comprising a body including an embossing station, a plurality of embossing means at the embossing station, operator means for actuating the embossing means located at the embossing station, feed means for advancing the strip of embossable material to locate successive areas of predetermined lengths of the strip at the embossing station in response to actuation of the operator means, regulator means for detecting the presence of a particular selected embossing means at the embossing station and determining the length of strip advanced by the feed means such that the length advanced will be in proportion to the maximum longitudinal dimension of the character corresponding to the selected embossing means at the embossing station, and registration means for locating each of the areas relative to the embossing means at the embossing station such that the center of the character to be embossed within that area coincides with the center of the area and adjacent characters will be spaced from one another in proportion to the maximum longitudinal dimensions of the adjacent characters. The invention further contemplates a clutch mechanism for use in connection with the feed means and a reciprocating operating member, the clutch mechanism having clutch elements which will operably engage the feed means with the operating member during only one stroke of the reciprocating motion to advance the embossable strip material through an increment determined by the length of the other stroke of the reciprocating motion, the clutch elements being comprised of helical springs arranged for alternately gripping and relaxing their grip on the coupled elements of the feed means, the reciprocating operating member and the body of the tool.

The invention will be more fully understood and still further objects and advantages thereof will become apparent in the following detailed description of embodiments of the invention illustrated in the accompanying drawing, in which:

FIGURE 1 is a plan view of a strip of material with a series of embossed characters having the centers thereof spaced equidistant from one another;

FIGURE 2 is a plan view of a strip of material with the same series of embossed characters spaced along the strip in proportion to the width of the characters;

FIGURE 3 is a plan view, partially sectioned, of an embossing tool constructed in accordance with the invention;

FIGURE 4 is a cross-sectional view taken along line 4—4 of FIGURE 3;

FIGURE 5 is an enlarged cross-sectional view taken along line 5—5 of FIGURE 3;

FIGURES 6 and 7 are diagrammatic views illustrating certain component parts of the embossing tool of FIGURES 3 and 4 in different operating positions;

Figure 8:
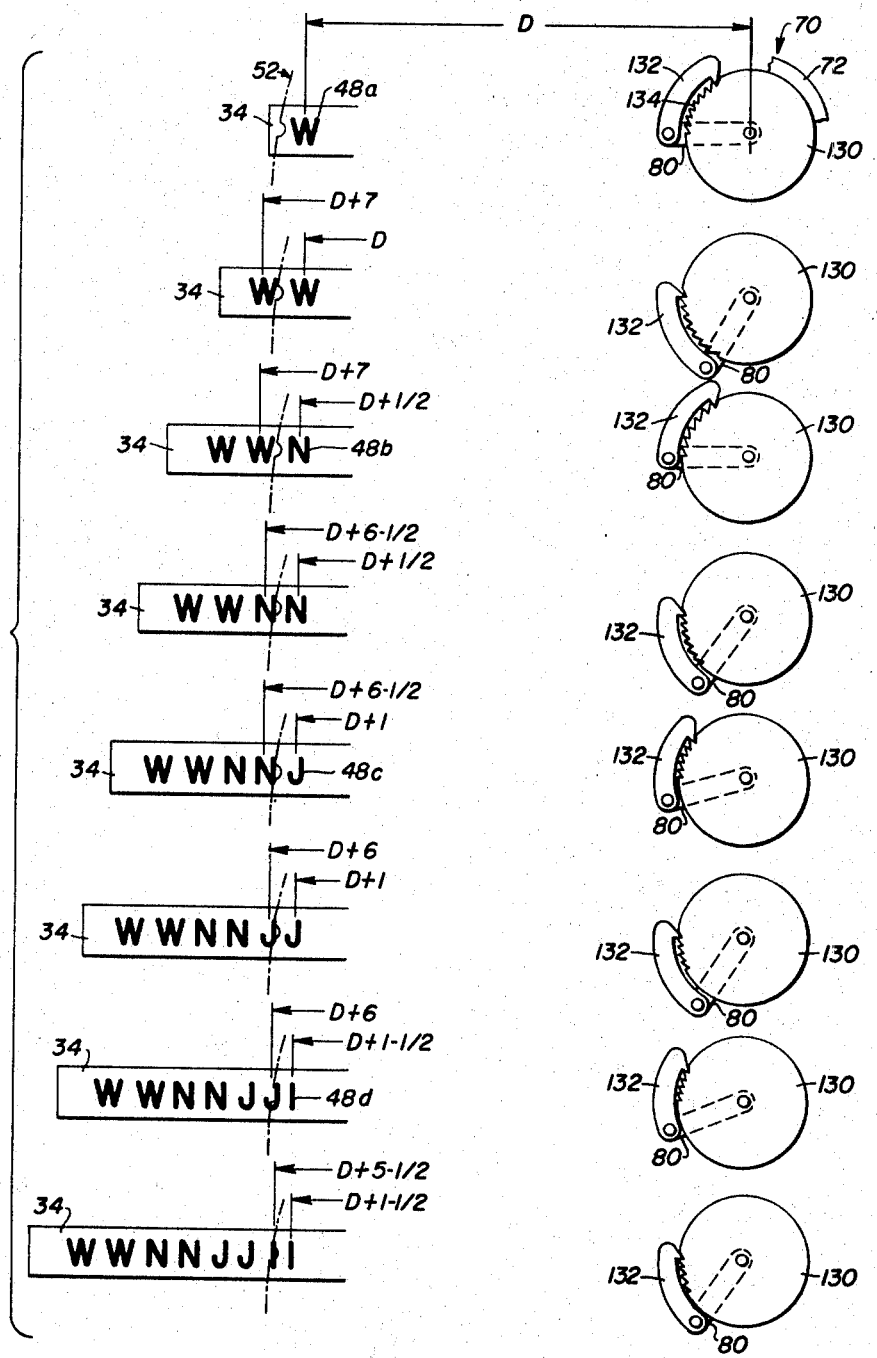
FIGURE 8 is a diagrammatic illustration of the operation of an embossing tool of the invention and showing an alternative embodiment.

Referring now to the drawing, FIGURES 1 and 2 illustrate the difference between a conventional embossed article and an embossed article fabricated with an embossing tool constructed in accordance with the invention. Thus, in FIGURE 1, a strip of embossable material is shown in the form of a length of plastic tape 10 fabricated of any one of a variety of thermoplastic synthetic resins currently available and having a series of characters 12, 14, 16 and 18 embossed therein. Each character is embossed within an area 19 of the tape 10 and is generally centered within its respective area 19. Since, in conventional embossing tools, the tape 10 is advanced through a predetermined increment for each embossment and that increment has the same length regardless of the width of the particular character being embossed, the amount of space beween adjacent characters will vary in accordance with the variations in the actual widths of the characters. On the other hand, in FIGURE 2, a strip of embossable material is shown in the form of a similar tape 20 having a series of embossed characters 22, 24, 26 and 28 generally centered within corresponding areas 29. Each of the areas 29 has a length which is proportional to the width, or maximum longitudinal dimension, of the character embossed within the area so that the spacing between centers of adjacent embossed characters varies in proportion to the width, or maximum longitudinal dimension, of these characters and variation in the spacing between adjacent characters is reduced. Thus, in the embossed article of FIGURE 2, which is fabricated with an embossing tool constructed in accordance with the invention, an aesthetically more pleasing appearance is provided due to the relationship between adjacent characters. In addition, the same number of characters of the same dimensions as shown in FIGURE 1 can be embossed on a significantly shorter length of tape as shown in FIGURE 2. Furthermore, where it has been the practice to condense the width of normally wider characters, such condensation is not necessary where the characters are spaced proportionally.

Turning now to FIGURES 3 through 7, an embossing tool constructed in accordance with the invention is illustrated at 30. Tool 30 has a housing or body 32 which has a general configuration adapted to make the tool easily operated while being held in one hand. The tool is designed to emboss selected indicia or characters on an elongated strip of embossable material such as the variety of thermoplastic synthetic resins currently available in the form of plastic tapes of various widths, one of which is shown in the form of tape 34 supplied in a coil or roll 36 carried within a magazine 38 (shown in phantom in FIGURE 4) and received within the body 32 through a door 40 in the rear 42 of the body, the door 40 being hinged to the body at 44 in a manner which will be more fully explained hereinafter.

Embossing of the tape 34 is accomplished at an embossing station 46 wherein there is located embossing means shown in the form of an embossing die set 48 actuated by a reciprocating actuating member 50. Die set 48 is one of a series of die sets located in selector means shown in the form of a selector wheel 52 which is mounted for rotation on spindle 53, secured to the body 32 by means of threaded portion 54, so that any one of the series of die sets can be located at the embossing station 46 to emboss selected characters in the tape 34. Selector wheel 52 is made up of upper and lower disk members 55 and 56, respectively, one of which carries the die and the other of which carries the punch of each die set. The upper and lower disk members are spaced apart axially such that each die set is normally open around the selector wheel and tape 34 can follow a path which passes between the disk members to the embossing station 46. The lower disk member 56 is divided into a plurality of radially extending fingers 58, each of which carries one of the portions of a die set, any of the fingers 58 being resiliently deflectable upwardly to bring the punch and die portions of a particular die set into mutual engagement. Upper and lower disk members 55 and 56 are interlocked with one another at 60 so that both will rotate together without relative rotation upon rotation of selector wheel 52. As best seen in FIGURE 3, the upper disk member 55 is provided with visible indicia 62 on the outer face thereof corresponding to the characters which can be embossed by the selectable die sets. Thus, when a selected die set is located at the embossing station for embossing a selected character, the corresponding indicia 62 becomes visible in a viewing window 64 placed at the embossing station and alignment of the indicia 62 with an index mark 66 will assure proper location of a selected die set 48 at the embossing station.

Selector wheel 52 may be removed from the body of the tool and replaced with any one of a number of selector wheels provided with a variety of embossable characters of different styles and sizes by merely removing spindle 53 from the body and sliding selector wheel 52 laterally out of the tool.

Tape 34 is fed from supply roll 36 out of the magazine 38 and through the body of the tool, passes around a guide post 68 and is led to feed means 70 which advances tape 34 in prescribed increments by means of a feed roll 72 which frictionally grips the tape where a pressure roll 74 presses the tape against the surface of the feed roll and which may be rotated in a clockwise direction (as seen in FIGURE 4) along with shaft 76 upon which feed roll 72 is mounted, shaft 76 being journaled for rotation within the body of the tool, all as will be explained hereinafter.

As best seen in FIGURES 3, 4 and 5, shaft 76 is journaled for rotation within the body 32 of the tool and feed roll 72 is keyed at 78 for rotation with the shaft 76. Feed roll 72 may be rotated in a clockwise direction by clockwise displacement of drive means shown in the form of feed arm 80, but is maintained stationary during counterclockwise displacement of feed arm 80 by virtue of clutch mechanism 82, shown in detail in FIGURE 5. Thus, feed roll 72, in addition to being provided with a rubber gripping member 84 for gripping and advancing the tape 34 and a central web 86 for carrying the gripping member, includes an arbor having portions 88 and 89 extending axially from each end of the central web 86. The feed arm 80 is integral with a drum 90 having an external diameter equal to the external diameter of the arbor portion 88 and mounted coaxially therewith upon shaft 76 for rotation relative to the shaft and the feed roll. A first helical clutch spring 92 couples the drum 90 and the juxtaposed arbor portion 88 and has an internal diameter small enough so that the convolutions of the spring 92 will grip the drum and the arbor portion during clockwise displacement of the drive arm and activate the clutch mechanism to rotate the feed roll in a clockwise direction and advance the tape 34 accordingly. However, the convolutions of the clutch spring 92 are so oriented that upon rotation of the drum in a counterclockwise direction, the grip of the clutch spring 92 may be relaxed so that the clutch mechanism is deactivated and relative rotation between the drum 90 and arbor portion 88 may take place. By orienting the convolutions of the helical clutch spring 92 such that the path of the helix followed by the convolutions advances toward the left in FIGURE 5 as the helix is followed in a clockwise direction in FIGURE 4, it will be seen that clockwise rotation of drum 90 will only tend to radially contract the helical clutch spring 92 and thus tighten the grip exerted by clutch spring 92 upon the drum and the arbor portion 88 while counterclockwise rotation of the drum will tend to radially expand the clutch spring 92 and relax the grip. A second helical clutch spring 94 couples the arbor portion 89 with a cylindrical boss 95 projecting from the body 32 of the tool 30. The convolutions of clutch spring 94 are oriented opposite to those of the first clutch spring 92 so that the path of the helix followed by the convolutions of the second clutch spring 94 advances toward the left in FIGURE 5 as the helix is followed in a counterclockwise direction in FIGURE 4. Thus, second clutch spring 94 will tend to contract and grip arbor portion 89 and juxtaposed boss 95 tightly upon any attempt to rotate the feed roll in a counterclockwise direction, but the spring 94 will tend to dilate radially and the grip will be relaxed to allow clockwise rotation of the feed roll.

Since the boss 95 is integral with the body of the tool and is thus fixed against rotation, it will be seen that movement of the feed arm in a counterclockwise direction will cause second clutch spring 94 to grip arbor portion 89 and maintain the feed roll 72 stationary while first clutch spring 92 will relax its grip and permit rotation of drum 90 relative to arbor portion 88 of the stationary feed roll. Upon movement of feed arm 80 in a clockwise direction, the first clutch spring 92 will grip the drum and the arbor portion 88 to drive the feed roll in a clockwise direction while the second clutch spring 94 will relax its grip and permit such clockwise rotation. Axial movement of the feed roll 72 relative to the shaft 76 is precluded by detent 96 which is lodged in a corresponding groove 97 in the shaft 76 and axial movement of drum 90 relative to shaft 76 is restrained by a retainer spring 98 so that the clutch springs 92 and 94 will function without excessive play in the system. A knob 99 is provided integral with shaft 76 and outside the body of the tool to permit manual rotation of the feed roll 72 and advancement of the tape 34 as desired. It will be apparent that the above described clutch mechanism allows the tape 34 to be advanced through an increment of any chosen length, the length of the increment being defined by the amount of clockwise displacement of feed arm 80.

Embossing of tape 34 is accomplished by displacing operator means illustrated in FIGURES 4 and 6 in the form of an actuating handle or lever 100, which is pivotally mounted to the body of the tool at 102, in a clockwise direction to depress the lever and bring actuating member 50, which is integral with lever 100, vertically upwardly into contact with one finger 58 of lower disk member 56, as seen in FIGURE 7, and continuing such displacement until member 50 activates the die set 48 positioned at the embossing station 46 and an embossment is established in the tape.

Feed means 70 is actuated in response to the actuation of the lever 100 so that tape 34 is advanced automatically after each embossing operation to provide the required spacing between adjacent embossed characters. A regulator means is interposed between the feed means and the operator means to assure that the increment of advancement of the tape 34 is proportional to the maximum longitudinal dimension of the character embossed during the embossing operation so that the centers of characters of different dimensions are spaced proportionally as seen in FIGURE 2 rather than equally as seen in FIGURE 1. Thus, lever 100 is normally biased toward the starting or rest position shown in FIGURES 4 and 6 by a helical spring 104 anchored at one end 106 to the body of the tool and at the other end 108 to a bracket 109 which is integral with lever 100. A carrier arm 110 is pivotally mounted to the body of the tool at 112 and is biased in a clockwise direction by a helical spring 114 fixed adjacent one end 116 of the carrier arm so that the other end 118 of the carrier arm is urged against a drive pin 120. A link 122 couples the carrier arm, adjacent end 116 thereof, to the feed arm 80 so that upon depression of the lever 100 and movement of the drive pin 120 to the left, as seen in FIGURE 7, helical spring 114 will pivot carrier arm 110 and link 122 will be drawn to the right to displace feed arm 80 in a counterclockwise direction. As set forth above in connection with the detailed description of clutch mechanism 82, such counterclockwise movement of feed arm 80 will be permitted without displacement of the feed roll 72. However, upon the release of lever 100 and the return of lever 100 to the rest position by the bias force of spring 104, drive pin 120 will engage carrier arm 110 to pivot the carrier arm in a counterclockwise direction, drive link 122 to the left and displace feed arm 80 in a clockwise direction. Such clockwise movement of the feed arm 80 will rotate the feed roll 72 in a clockwise direction and advance the tape 34 over an increment having a length which is directly related to the amount of travel of link 122. It will be apparent, then, that the length of the increment of advancement of the tape may be regulated by controlling the amount of displacement of link 122 and the feed arm 80.

In tool 30, tape 34 is advanced through an increment which is directly proportional to the maximum longitudinal dimension of the character embossed at the embossing station. Thus, link 122 includes a portion extending beyond carrier arm 110 to provide a sensing member 124 which will travel along a longitudinal path defined by the movement of end 116 of the carrier arm 110. Since the length of travel of the link 122 defines the length of the increment of advancement of tape 34, stop means are placed in the path of travel of the sensing member 124 and are shown in the form of stops 126 of various lengths (see FIGURE 3) carried by the lower disk member 56 and providing abutments which the sensing member will engage to limit the movement of link 122 to the predetermined displacement necessary to achieve the desired movement of feed arm 80 and the corresponding subsequent advancement of tape 34. The length of each stop 126 corresponds to the width, or maximum longitudinal dimension, of a diametrically opposite embossing die set 48 so that when a particular die set is located at the embossing station the corresponding stop is located at a regulator station in the path of travel of the sensing member 124. Thus, the narrower the width of the character to be embossed, the longer will be the length of the corresponding stop and the shorter will be the length of travel of link 122. As best seen in FIGURE 7, once the sensing member 124 engages the stop 126 movement of the carrier arm is terminated, but depression of lever 100 can continue until actuation of the die set 48 is completed. In order to accomplish such freedom of movement, drive pin 120 merely leaves carrier arm 110 behind; however, upon return of the lever toward the rest position, shown in FIGURE 6, drive pin 120 will engage the carrier arm and spring 104 will pivot the carrier arm to actuate the feed means 70 and thereby rotate feed roll 72 and advance tape 34 through the prescribed increment defined by the travel of link 122 and feed arm 80.

Thus far, it has been shown how tool 30 is constructed to advance tape 34 through an increment which is governed by the width of the character embossed subsequent to the embossing of the character. It will be apparent that since the advancement of tape 34 takes place after the embossment of a chosen character and before the next character is chosen, the tool requires some means for assuring that each subsequently embossed character is registered with respect to the previously embossed character so that the spacing between centers of adjacent characters will be proportional to the widths of the characters. It is noted that for the purposes of the following discussion the term "center" as applied to the embossed characters may encompass the "visual" center as well as the "dimensional" center of an embossed character and the choice of either center from which the spacing between adjacent characters is gaged can be made without affecting the operation of a tool constructed in accordance with the invention. The visual center of a character is a point about which the character has equal visual "weight" rather than equal physical dimensions, whereas the dimensional center is that point about which the character has equal physical dimensions. For example, the visual center of the letter E would lie somewhat to the left of the actual dimensional center and the letter U would have a visual center somewhat below the dimensional center, while the visual center of the letter H would coincide with the actual dimensional center. In order to attain the desired relationship between adjacent embossed characters, the center of each character is located at the center of the area of the tape within which the character is embossed, as described above in connection with FIGURE 2, and the longitudinal extent of each area is varied in proportion to the maximum longitudinal dimension of the character embossed therein.

In tool 30, each area of the tape is located at the embossing station prior to the embossing operation, but the full longitudinal extent of the area is unknown until the choice is made of a character to be embossed. Therefore, a registration means is provided in tool 30 to center each character within its prescribed area and is best explained in connection with FIGURE 8.

The diagrammatic illustration of FIGURE 8 shows only portions of a tool constructed in a similar manner to tool 30 with the exception that the clutch mechanism 82 in connection with the feed means 70 of tool 30 has been replaced by a pawl and ratchet mechanism for ease of description as well as for an illustration of an alternative construction. Thus, the feed roll 72 is shown operatively engaged for rotation with a ratchet wheel 130 and the feed arm 80 now carries a pawl 132 which can be engaged with any one of the series of teeth 134 spaced around the periphery of the ratchet wheel. Relative movement between the pawl and the ratchet wheel takes place during the depression of the operator lever of the tool and pivotal movement of the carrier arm of the tool so that pawl 132 will traverse the periphery of ratchet wheel 130 until the stop 126 which corresponds with the chosen die set 48 precludes further movement of the feed arm 80 and the pawl 132. The subsequent increment of advancement of the tape 34 is governed by the number of teeth 134 traversed or "picked up" by the pawl 132 during clockwise movement of the feed arm 80 and the pawl 132 with respect to the ratchet wheel 130.

The registration means of the present structure will now be described with reference to FIGURE 8.

Turning to the first diagram at the top of FIGURE 8, it is seen that the selector wheel 52 has been rotated so that the particular die set 48a for the character W has been placed at the embossing station and is located a distance D from a fixed point at the feed means 70. The operating lever of the tool has been depressed so that the pawl 132 has picked up seven teeth 134 and the letter W is about to be embossed in tape 34. In the next diagram, the operating lever has been released and returned to the rest position and the pawl 132 has rotated the ratchet wheel 130 to advance the tape (to the left) over an increment corresponding to the peripheral measure of seven teeth on the ratchet wheel so that the center of the embossed W is now located at $D+7$ steps and another area of tape 34 is located at the embossing station. Another letter W may then be embossed and the centers of adjacent letters W will be spaced apart the distance corresponding to seven teeth on the ratchet wheel, or seven steps.

Subsequent to the embossing of the second letter W, another die set 48b is placed at the embossing station—this time, for the letter N as seen in the third illustration. The letter N is narrower than the letter W and the stop corresponding to the die set 48b allows the feed arm 80 to traverse only far enough for the pawl 132 to pick up six teeth. The letter N may now be embossed; however, since the tape has already been advanced seven steps subsequent to embossing the second W and will not be further advanced until after embossment of the N, the die set 48b must be spaced further from the feed means than the die set 48a by an amount sufficient to bring the center of the letter N nearer to the center of the second embossed W than the spacing between centers of adjacent letters W and to bring the center of the embossed letter N into coincidence with the center of the area of the tape within which the letter N will be embossed. The length of the area of the tape within which the letter W is embossed corresponds to seven teeth on the ratchet wheel and the letter W may be characterized as a "seven step" letter. The length of the area within which the letter N is to be embossed corresponds to six teeth on the ratchet wheel and may be characterized as a "six step" letter. The proper proportional spacing between centers of adjacent embossed characters is achieved when the distance between the centers of any two adjacent characters is equal to one-half the sum of the increments of advancement for both characters. Thus, the die set 48b must be located a distance of D+½ step from the feed means in order to place the center of embossed letter N a distance of 6½ steps from the center of embossed letter W, or one-half the sum of seven plus six. This spacing of the die set 48b from the feed means is accomplished by merely locating the die set 48b further from the center of the selector wheel than die set 48a.

Continuing now to the fourth diagram in FIGURE 8, the first letter N has been embossed and the tape has been advanced six steps. Another letter N may now be embossed in the tape and the distance between centers of adjacent embossed letters N will be six steps so that the spacing between narrower letters N is not disproportionately greater than the spacing between the wider embossed letters W or the spacing between the adjacent letters W and N.

Proceeding to the fifth diagram in FIGURE 8, the letters W and N have been embossed and the die set 48c for the letter J has been placed at the embossing station and the letter J is about to be embossed into tape 34. The letter J is narrower than the letter N and the pawl 132 is allowed to pick up only five teeth on the ratchet wheel 130. Since the letter J is a five-step letter and the letter N is a six-step letter, the distance between the centers of adjacent embossed letters N and J should be one-half the sum of the feed increments for both letters or 5½ steps. The die set 48c is therefore located a distance of D+1 step from the feed means 70 in order to place each letter J within the area on the tape provided therefor with the center of the letter coinciding with the center of the area. After embossing the letter J, the tape 34 is advanced five steps and another letter J may be embossed, as seen in the sixth diagram. The centers of the embossed letters J will be spaced only five steps apart so that again the narrower letters will be closer together to maintain a proportional spacing between the narrower letters.

Arriving finally at the seventh and eighth diagrams of FIGURE 8, another die set 48d is positioned at the embossing station for embossing the letter I, the narrowest of letters. The pawl 132 is allowed to pick up only four teeth on the ratchet wheel 130 before the letter I is embossed. Since the letter I is a four-step letter, the die set 48d must be located a distance of D+1½ steps from the feed means and is therefore placed even further from the center of the selector wheel than any of the die sets 48a, 48b, or 48c. After embossing the first letter I, the tape is advanced four steps and a second letter I may be embossed, the centers of adjacent embossed letters I being spaced apart by the distance of four steps.

By examining the above relationships it will be seen that for each decrease of one step of advancement subsequent to the embossing of a character, the die set for that character must be located one-half a step further from the feed means to maintain the desired proportional spacing between adjacent embossed characters.

As explained above, FIGURE 8 illustrates the use of a pawl and ratchet mechanism in connection with the feed means for simplicity of description. It will be appreciated that the employment of the clutch mechanism 82 in tool 30 in place of a pawl and ratchet mechanism permits an infinite variation in feed increments among characters of various dimensions rather than the limited variation allowed by the fixed steps of a ratchet mechanism; however, the general relationship between the regulating means which regulates the increment of advancement after each embossing operation and the registration means which locates the embossed character correctly within the area of the tape in which the character is to be embossed remains the same. Thus, any movement of the carrier arm 110 may be translated into a corresponding movement of the feed roll 72 and such corresponding movement becomes measured by the amount of movement permitted by the stops 126. Additionally, the clutch mechanism 82 functions silently and with less likelihood of error due to variations as a result of manufacturing tolerances and wear.

Returning now to FIGURES 3 and 4, tape 34 is shown passing between upper and lower disks 55 and 56 of the selector wheel and is accurately guided along a path leading to the embossing station 46 by a tape chute 138. Tool 30 is designed to accommodate tapes of different widths and includes alignment means for maintaining such tapes in accurate lateral alignment with the embossing means. The alignment means comprises a pair of guide walls 140 in the path of travel of the tape and juxtaposed with the embossing station, the guide walls forming guide channels 142 and 144 of two different widths with wider channel 142 being disposed vertically above narrower channel 144. Guide walls 140 are carried by an arm 146 pivotally mounted in body 32 at 148. A control button 150 extends through the body of the tool and is integral with arm 146 so that vertical displacement of the control button 150 will pivot arm 146 between upper and lower positions and will selectively locate either channel 142 or 144 in the path of travel of the tape. Detent means 152 retain arm 146 in either of the upper or lower positions.

Upon completion of the particular embossed article, the article may be severed from the tape by cut-off means illustrated at 160 in the form of blades 162 and 164 located vertically above the path of tape 34 and an anvil 166 located below the path of tape 34. As best seen in FIGURE 4, the anvil 166 is a part of a resiliently deflectable cantilever member 168 fixed in the body of the tool and is normally spaced away from blades 162 and 164 so as to allow free passage of tape 34 from the alignment means into the cut-off means. When the last embossment of a particular embossed article is completed, the tape is manually indexed by rotation of the knob 99 which operates feed means 70, a second lever 170, also pivotally mounted in the body 32 at 102, is depressed so that an actuating member 172 thereon is brought into engagement with the anvil 166 and the anvil is deflected upwardly. Such upward movement of the anvil will bring tape 34 against cutting blades 162 and 164. Blade 162 will then sever the tape while blade 164 will establish a tab at the severed end of the completed embossed article for facilitating the subsequent removal of a backing strip which is generally present as a part of the embossable strip material. Upon completion of the cuttting operation, lever 170 is released and the resiliency of the cantilever member 168 will return the anvil 166 and the lever 170 to their normal rest positions shown in FIGURE 4.

Figure 9:
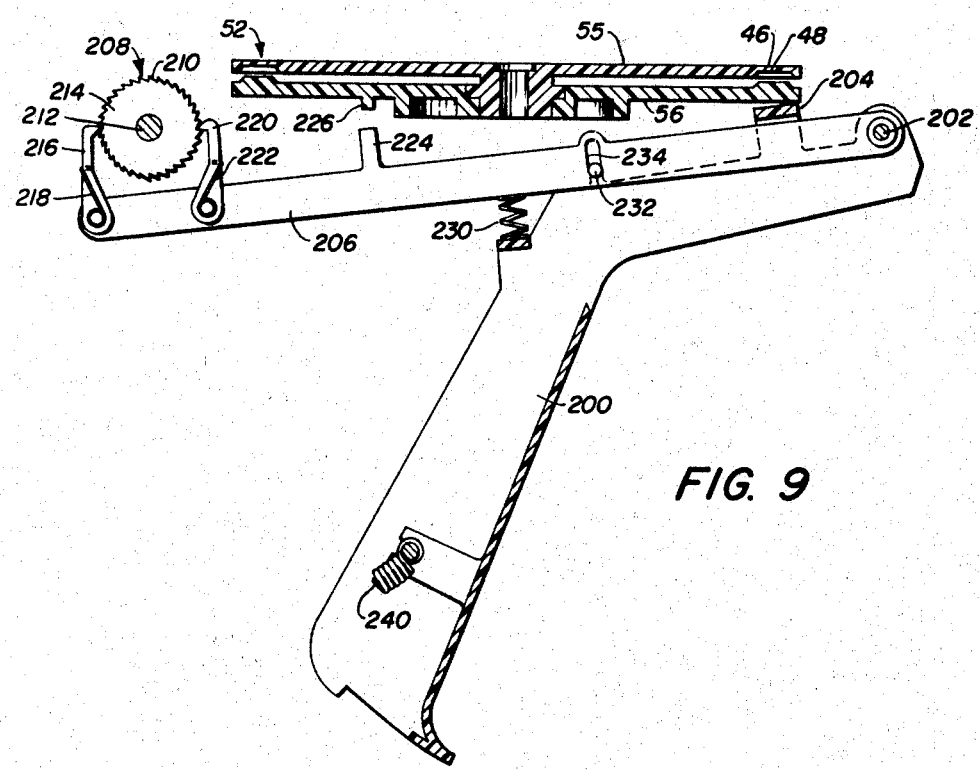
FIGURES 9 and 10 are diagrammatic views illustrating certain alternative component parts of another embossing tool constructed in accordance with the invention.
Figure 10:
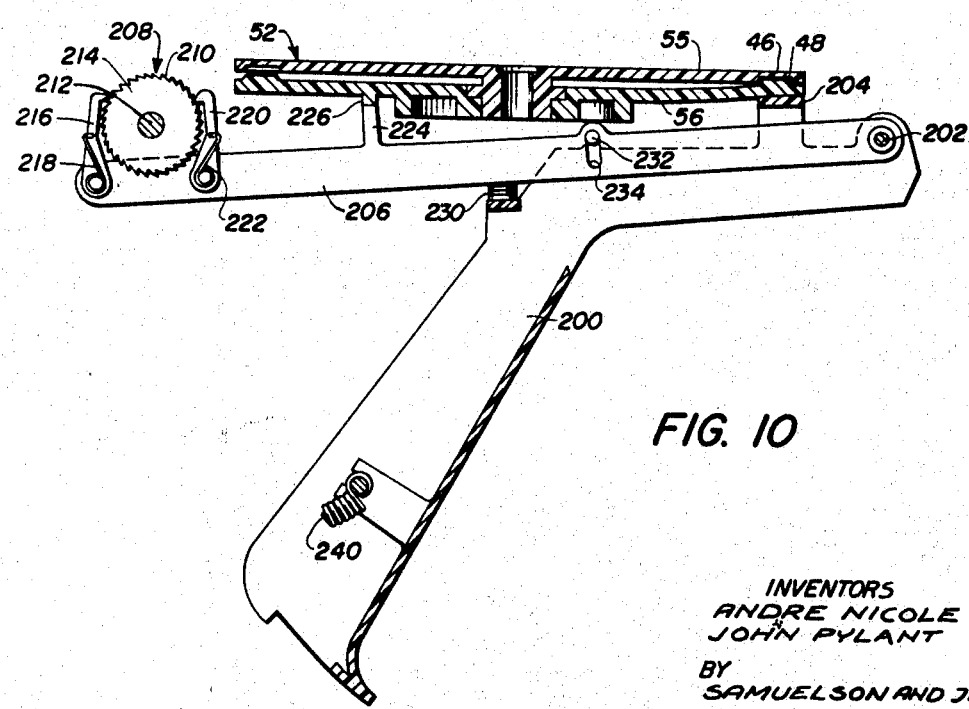

Referring now to FIGURES 9 and 10, the main operating component parts of an alternative embossing tool are illustrated in two operating positions. As in tool 30, the alternative tool has a selector wheel 52 comprised of upper and lower disks 55 and 56, respectively, carrying a plurality of die sets 48 for embossing a strip of embossable material or tape at an embossing station 46. An operator means in the form of lever 200 is pivotally mounted in the body of the tool at 202 for movement between a rest position, shown in FIGURE 9, and an embossing position, illustrated in FIGURE 10, wherein the actuating means 204 actuates a particular die set located at the embossing station to emboss a selected character in the tape.

A carrier arm 206 is also mounted in the body at 202 for pivotal movement in response to movement of the lever 200. A feed means 208 includes a feed roll 210 for advancing the tape to be embossed from the left to the right. Feed roll 210 is mounted for rotation with a shaft 212 journaled in the body of the tool and carrying a ratchet wheel 214 associated with the feed roll for rotation therewith. A first pawl 216 is carried on the carrier arm and biased into engagement with the ratchet wheel 214 by a first spring 218 such that upon upward movement of the carrier arm 206, the first pawl 216 will engage a tooth on the ratchet wheel 214 and drive the ratchet wheel and feed roll 210 in a clockwise direction. A second pawl 220 is carried on the carrier arm 206 and biased into engagement with the opposite side of the ratchet wheel by a second spring 222 such that upon downward movement of the carrier arm, the second pawl will engage a tooth on the ratchet wheel and drive the ratchet wheel and feed roll in a clockwise direction. Thus it is seen that the tape is advanced in two steps, the first step occurring during upward movement of the carrier arm 206 and the second step occurring during downward movement of the carrier arm.

The total length of the area of tape advanced by the feed means 208 is regulated so that the length is proportional to the maximum longitudinal dimension of the character being embossed at the embossing station. Regulating means are shown in the form of a sensing member 224 projecting upwardly from the carrier arm 206 and movable therewith and a series of stops 226 integral with the lower disk 56 of the selector wheel and placed in the path of travel of the sensing means. A helical spring 230 couples the carrier arm and the lever 200 such that when the lever is depressed, or pivotally moved from the rest position shown in FIGURE 9 toward the embossing position shown in FIGURE 10, the amount of force necessary to compress helical spring 230 is so great that the carrier arm 206 and the lever 200 will move together as a unit and the first pawl 216 will rotate the ratchet wheel 214 and feed roll 210 to advance the tape through the first step until the sensing member 224 contacts the stop 226. Upon the engagement of the sensing member with the stop, movement of the carrier arm will cease and further rotation of the feed roll will be precluded; however, continued depression of the lever will be permitted by compression of helical spring 230 until guide pin 232, which is fixed to lever 200 and is normally biased against the bottom of a corresponding slot 234 in the carrier arm, strikes the top of the slot 234. Such continued movement of the lever 200 while the carrier arm and feed roll are held motionless will allow actuating member 204 to engage the selected die set 48 at the embossing station and emboss a character in the tape. Upon release of the lever 200, a helical spring 240 will return the lever 200 toward its rest position and guide pin 232 will engage the bottom of slot 234 and draw the carrier arm downwardly thereby causing the second pawl 220 to advance the tape through the second step subsequent to the embossing operation. It will be apparent that by the proper choice of the length of stop 226 the length of the area of tape advanced during the entire operating cycle may be accurately determined and by providing a series of stops 226 of varying lengths corresponding with the widths of the various characters the length of tape advanced may be made proportional to the width of the character being embossed.

Each of the embossed characters is properly registered, with the center of the character coinciding with the center of the area of tape within which the character is embossed, by assuring that the first and second pawls 216 and 220 advance the tape over equal increments of advancement and each die set is properly located at the embossing station so that the center of the total length of tape advanced by both steps of advancement will coincide with the center of the character embossed at the embossing station.

Returning now to tool 30, the regulator means provided in tool 30 may be employed to render the tool capable of embossing more than one character within any single area of the tape 34 so that composite characters may be created with ease. For example, certain accent marks employed in such languages as German, French and Spanish, as well as in English, i.e., the German umlaut, the French acute, grave and cedilla, and the Spanish circumflex, as well as the English dieresis which is used to separate the vowel elements of a diphthong, must be placed above or below a letter and must be aligned longitudinally within the same area in which the letter is embossed. Looking back to FIGURE 3, selector wheel 52 of tool 30 is provided with a die set 248 for embossing an accent mark shown in the form of a dieresis or umlaut. Diametrically opposite the die set 248, a corresponding stop 250 is provided and is seen to extend radially a distance great enough so that when die set 248 is at the embossing station, the stop 250 will lie in the path of the sensing member 124 of link 122 and will preclude any movement of the link 122 to the right (FIGURE 4) in response to the depression of lever 100. Thus, the accent mark can be embossed, but there will be no subsequent advancement of the tape since there is no displacmnt of link 122 during the movement of lever 100 from the rest position to the embossing position. Hence, by first selecting die set 248 and embossing the accent mark and then selecting the die set for the character with which the accent mark is to be associated, both the character and the accent mark can be embossed at the same longitudinal location in the tape and will appear as a composite character embossed within a single area of the tape.

It is to be understood that the above detailed description of embodiments of the invention are provided by way of example only. Various details of design and construction may be modified without departing from the true spirit and scope of the invention as set forth in the appended claims.

The embodiments of the invention in which an exclusive property or privilege is claimed are defined as follows:

1. An embossing tool for embossing a series of characters of various dimensions along the length of an elongate strip of embossable material with the centers of adjacent characters being spaced from one another longitudinally in proportion to the maximum longitudinal dimensions of the adjacent characters, said tool comprising:

a body including an embossing station at a fixed location in the body;

a plurality of embossing means corresponding to said series of characters associated with said body;

selector means for selectively locating any one of said embossing means at said embossing station;

operator means for actuating the embossing means located at the embossing station;

feed means for advancing the strip of embossable material along a path extending from a fixed point in the body toward the embossing station to locate successive areas of predetermined lengths of said strip at said embossing station in response to actuation of said operator means;

regulator means for detecting the presence of a particular selected embossing means at the embossing station and determining the length of strip advanced by said feed means such that the length advanced will be in proportion to the maximum longitudinal dimension of the character corresponding to the selected embossing means at said embossing station, said regulator means including a regulator station;

a carrier arm mounted in the body for reciprocating movement in opposite directions in response to actuation of the operator means;

a sensing member carried by the carrier arm for reciprocating movement along a path passing through said regulator station;

a plurality of stops corresponding to the plurality of embossing means, any one of said stops being located in the path of said sensing member at said regulator station when a corresponding embossing means is located at the embossing station to engage the sensing member and preclude the travel of the carrier arm beyond the position where the sensing member contacts the stop;

means coupling the carrier arm with the feed means such that the increment of advancement of the strip corresponds to the limited travel of the carrier arm allowed by the stop at the regulator station, said limited travel and the concomitant increment being in proportion to the maximum longitudinal dimension of the character embossed by the embossing means at the embossing station; and registration means for locating each said area relative to the embossing means at the embossing station such that the center of the character to be embossed within that area coincides with the center of the area required for that character and the centers of adjacent characters in the series of embossed characters will be spaced from one another in proportion to the maximum longitudinal dimensions of the adjacent characters, said registration means locating each said embossing means with respect to said fixed point when the embossing means is at the embossing station such that the distance between the fixed point and the center of the character embossed by that embossing means is varied for characters of different maximum longitudinal dimensions by an amount assuring that the distance between the centers of any two adjacent embossed characters is equal to one-half the sum of the increments of advancement for both characters.

2. The embossing tool of claim 1 wherein:
said operator means includes an actuating handle mounted in said body for reciprocating movement between first and second positions;
said feed means includes movable means for gripping and advancing said strip; and
said means coupling the operator means and the feed means advances the strip through an increment equal to the full predetermined length of one said successive area during movement of the actuating handle from one of said first and second positions to the other of said first and second positions.

3. The embossing tool of claim 2 wherein the distance between the fixed point and each selected embossing means is such that the distance between the fixed point and the center of each character to be embossed at the embossing station is varied between any two embossing means for embossing characters of different maximum longitudinal dimensions by an amount equal to the difference between the predetermined lengths of the corresponding areas in which the characters are to be embossed divided by two.

4. The embossing tool of claim 3 wherein:
said first position of the actuating handle is a rest position;
said second position of the actuating handle is an embossing position;
the selected embossing means at the embossing station is actuated upon movement of said actuating handle from the rest position to the embossing position;
the means coupling the operator means and the feed means is responsive to movement of the actuating handle from the embossing position toward the rest position to accomplish advancement of the strip through said increment as the actuating handle travels from the embossing position to the rest position subsequent to actuation of the embossing means at the embossing station; and
the distance between the fixed point and the center of the embossed character at the embossing station is greater for characters of smaller maximum longitudinal dimension than for characters of larger maximum longitudinal dimension.

5. The embossing tool of claim 4 including additional means for embossing more than one character within the same area of the strip of embossable material, said additional means comprising:
additional embossing means capable of being positioned at the embossing station;
additional means associated with said regulating means and responsive to the presence of said additional embossing means at the embossing station for precluding movement of said movable means in response to movement of said actuating handle.

6. The embossing tool of claim 1 wherein said feed means includes a feed roll mounted for rotation in the body for gripping and advancing the strip in prescribed increments corresponding to the amount of rotation of the feed roll.

7. The embossing tool of claim 6 wherein the distance between the fixed point and the center of the character embossed by the embossing means at the embossing station is greater for characters of smaller maximum longitudinal dimension than for characters of larger maximum longitudinal dimension by an amount assuring that the distance between the centers of any two adjacent embossed characters is equal to one-half the sum of the increments of advancement for both characters.

8. The embossing tool of claim 6 including a selector wheel mounted for rotation in the body of the tool;
said plurality of embossing means being carried by the selector wheel and being selectively located at the embossing station by rotation of the selector wheel; and
said stops being carried by the selector wheel such that each stop corresponding to each embossing means will be located at the regulator station when the corresponding embossing means is located at the embossing station.

9. The embossing tool of claim 8 including additional means for embossing more than one character within the same area of the strip of embossable material, said additional means comprising:
additional embossing means capable of being positioned at the embossing station;
additional stop means associated with said regulator means and located in the path of said sensing member when the additional embossing means is positioned at the embossing station, said additional stop means being so located in said path as to preclude any movement of the carrier arm which could result in actuation of the feed means to advance the strip in response to actuation of the operator means.

10. The embossing tool of claim 6 wherein the means coupling the carrier arm with the feed roll includes:
a ratchet wheel mounted for rotation with the feed roll;
a pawl associated with the carrier arm and operatively engaging said ratchet wheel for rotation of the ratchet wheel and concomitant rotation of the feed roll in response to movement of the actuator handle from the embossing position toward the rest position and concomitant movement of the carrier arm;
said sensing member cooperating with said stop during movement of the actuating handle from the rest position toward the embossing position to allow the pawl to move relative to the ratchet wheel only a sufficient displacement to subsequently displace the ratchet wheel and feed roll for advancing said prescribed increment.

11. The embossing tool of claim 6 wherein the means coupling the carrier arm with the feed roll includes:
a clutch mechanism associated with the feed roll; and
a link connecting the carrier arm with the clutch mechanism such that movement of the carrier arm in one of said opposite directions will engage the clutch mechanism and rotate the feed roll, and movement of the carrier arm in the other of said opposite directions will disengage the clutch mechanism and allow movement of the carrier arm in the other of said opposite directions without rotation of the feed roll.

12. The embossing tool of claim 11 wherein the clutch mechanism includes:

drive means mounted in the body of the tool for movement in one direction away from a rest position through a displacement measured by the movement of the carrier arm in one of said opposite directions and for movement in an opposite direction toward said rest position in response to the movement of the carrier arm in the other of said opposite directions;

a first helical spring means coupling the drive means and the feed roll and including convolutions arranged for permitting movement of the drive means relative to the drive roll in one of said directions, and operatively engaging the feed roll for concurrent movement thereof during movement of the drive means in the other of said directions; and a second helical spring means coupling the feed roll and the body of the tool and including convolutions arranged for permitting movement of the feed roll in a direction to advance the strip, and precluding movement of the feed roll in an opposite direction.

13. The embossing tool of claim 12 wherein:

said feed roll includes an arbor;

said drive means includes a drum mounted for rotation coaxial with said arbor;

said first helical spring means includes a first helical spring having convolutions engaging said drum and said arbor, said convolutions being oriented for relaxation of the engagement of the convolutions with the drum and the arbor upon rotation of the drum in one direction to permit rotation of the drum relative to the arbor, and oriented for increased gripping engagement of the convolutions with the drum and the arbor upon rotation of the drum in an opposite direction to operatively engage the drum and the arbor for concurrent rotation; and said second helical spring means includes a second helical spring having convolutions engaging said arbor and the body of the tool, said convolutions being oriented for relaxation of the engagement of the convolutions with the arbor and the body upon rotation of the arbor by the drum in one direction to permit such rotation relative to the body, and oriented for increased gripping engagement of the convolutions with the arbor and the body upon any attempt to rotate the arbor in the opposite direction to preclude such rotation in the opposite direction.

14. The embossing tool of claim 13 wherein:

the arbor is generally cylindrical and has an external diameter;

the drum is generally cylindrical and has an external diameter equal to the external diameter of the arbor and juxtaposed therewith;

the first helical spring has an internal diameter corresponding to said external diameters with convolutions thereof overlying the arbor and the drum, said convolutions following a helical path tending to radially contract said convolutions upon rotation of the drum in the direction toward said rest position of said drive means, in which direction the arbor and the drum will rotate concurrently and tending to radially dilate said convolutions upon rotation of the drum in the opposite direction from said rest position of the drive means to relax the grip of the first helical spring upon the drum and the arbor and permit rotation of the drum relative to the arbor;

the body of the tool includes a stationary, generally cylindrical boss coaxial with said arbor and having an external diameter equal to the external diameter of the arbor and juxtaposed therewith; and the second helical spring has an internal diameter corresponding to said external diameters with convolutions thereof overlying the arbor and the boss, said convolutions following a helical path tending to radially dilate said convolutions to permit rotation of the arbor by the drum relative to the boss in the direction in which the drum and the arbor will rotate concurrently and tending to radially contract said convolutions to grip the arbor and the boss and preclude rotation of the arbor in the opposite direction.

15. An embossing tool for embossing a series of characters of various dimensions along the length of an elongate strip of embossable material with the centers of adjacent characters being spaced from one another longitudinally in proportion to the maximum longitudinal dimensions of said adjacent characters, said tool comprising:

a body including an embossing station;

a plurality of embossing means corresponding to said series of characters associated with said body;

operator means for actuating the embossing means located at the embossing station, said operator means including an actuating handle mounted in said body for reciprocating movement between a rest position and an embossing position;

feed means for advancing the strip of embossable material to locate successive areas of predetermined lengths of said strip at said embossing station in response to actuation of said operator means, said feed means including movable means for gripping and advancing said strip;

means coupling the operator means and the feed means such that the strip is advanced initially by said movable means prior to actuation of the embossing means and during movement of said actuating handle from the rest position toward the embossing position and is advanced subsequently by said movable means during movement of said actuating handle back toward the rest position from the embossing position;

regulator means for detecting the presence of a particular selected embossing means at the embossing station and determining the length of strip advanced by said feed means such that the total length advanced during movement of said actuating handle from the rest position to the embossing position and from the embossing position back to the rest position will be in proportion to the maximum longitudinal dimension of the character corresponding to the selected embossing means at said embossing station and the length of each area will be in proportion to the maximum longitudinal dimension of each corresponding embossed character; and registration means for locating each said area relative to the embossing means at the embossing station, said registration means including means responsive to the presence of a particular selected embossing means at said embossing station for limiting the length of the initial advancement to correspond to one-half the predetermined length of the area of the strip within which a selected character is to be embossed and for controlling the length of the subsequent advancement to correspond to the remaining one-half of said predetermined length so that the center of the embossed character will coincide with the center of said area and the centers of adjacent characters in the series of embossed characters will be spaced from one another in proportion to the maximum longitudinal dimensions of the adjacent characters.

16. The embossing tool of claim 15 wherein said feed means includes a feed roll mounted for rotation in the body for gripping and advancing the strip in increments corresponding to the amount of rotation of the feed roll and said regulator means including a regulator station, said tool including:

a carrier arm mounted for reciprocating movement in opposite directions in response to actuation of the operator means;

a sensing member carried by the carrier arm for reciprocating movement along a path passing through said regulator station;

a plurality of stops corresponding to the plurality of embossing means, any one of said stops being located in the path of said sensing member at said regulator station when a corresponding embossing means is located at the embossing station to engage the sensing member and preclude the travel of the carrier arm beyond the position where the sensing member contacts the stop;

a ratchet wheel mounted for rotation with the feed roll;

first and second pawls carried by said carrier arm and engaging the ratchet wheel, said first pawl being in operative engagement with the ratchet wheel to initially rotate the ratchet wheel during movement of the carrier arm in one of said opposite directions and movement of the sensing member toward the stop in the regulator station until the sensing member contacts the stop, and said second pawl being in operative engagement with the ratchet wheel to subsequently rotate the ratchet wheel in the same direction as the initial rotation during movement of the carrier arm in the other of said opposite directions; and said means coupling the operator means and the feed means including means coupling the operator means with the carrier arm such that the embossing means at the embossing station is actuated to emboss a corresponding character in the area of the strip located at the embossing station after said initial rotation of the ratchet wheel and before the subsequent rotation thereof;

each said stop, when placed at said regulator station, having a location along the path of the sensing member related to the maximum longitudinal dimension of the character embossed by the corresponding embossing means at the embossing station such that only that initial rotation of the ratchet wheel will be enabled which will rotate the feed roll and advance the strip through one-half the predetermined length of the area of the strip upon which the selected embossing means will emboss a corresponding character and only that subsequent rotation of the ratchet wheel will be enabled which will rotate the feed roll and advance the strip through the remaining one-half of the predetermined length of said area so that the center of the embossed character will coincide with the center of the area and the length of each area will be in proportion to the maximum longitudinal dimension of each corresponding embossed character.

17. A clutch mechanism for use in an embossing tool for embossing characters in an elongated strip of embossable material, said tool having a body, operating means associated with said body and at least one operating member mounted in the body for reciprocating motion in response to actuation of the operating means, feed means including a gripping member mounted in the body for movement to advance the strip through the body, and coupling means including said clutch mechanism coupling said gripping member and said operating member for moving said gripping member to effect advancement of the tape during one stroke of said reciprocating motion through any desired increment of advancement measured by the length of the other stroke of said reciprocating motion, said clutch mechanism comprising:

drive means mounted in the body for movement independent of the movement of said gripping means;

means coupling the drive means with the operating member such that said drive means will be moved in one direction of displacement away from a rest position through a displacement measured by the length of one of said strokes and be moved in another direction of displacement to be returned toward said rest position in response to the movement of the operating member through the other of said strokes;

a first helical spring means coupling the drive means and the gripping means and including convolutions encircling and engaging at least a portion of the drive means and encircling and engaging at least a portion of the gripping means, said convolutions following a helical path of revolution in a first direction of revolution arranged for permitting movement of the drive means relative to the gripping means in one of said directions of displacement and operatively engaging the gripping means for concurrent movement thereof during movement of the drive means in the other of said directions of displacement; and a second helical spring means coupling the gripping means and the body of the tool and including convolutions encircling and engaging at least a portion of the gripping means and encircling and engaging at least a portion of the body of the tool, said convolutions following a helical path of revolution in a second direction of revolution opposite to said first direction of revolution and arranged for permitting movement of the gripping means in a direction to advance the strip and precluding movement of the gripping means in an opposite direction.

18. The clutch mechanism of claim 17 wherein:

said feed means comprises a feed roll mounted for rotation in the body of the tool and including said gripping means and an arbor;

said drive means includes a drum mounted for rotation coaxial with said arbor;

said first helical spring means includes a first helical spring having convolutions encircling and engaging said drum and encircling and engaging said arbor, said convolutions being oriented for relaxation of the engagement of the convolutions with the drum and the arbor upon rotation of the drum in one direction to permit rotation of the drum relative to the arbor and oriented for increased gripping engagement of the convolutions with the drum and the arbor upon rotation of the drum in an opposite direction to operatively engage the drum and the arbor for concurrent rotation; and said second helical spring means includes a second helical spring having convolutions encircling and engaging said arbor and encircling and engaging a portion of the body of the tool, said convolutions being oriented for relaxation of the engagement of the convolutions with the arbor and the body upon rotation of the arbor by the drum in one direction to permit such rotation relative to the body and oriented for increased gripping engagement of the convolutions with the arbor and the body upon any attempt to rotate the arbor in the opposite direction to preclude such rotation in the opposite direction.

19. The clutch mechanism of claim 18 wherein:

the arbor is generally cylindrical and has an external diameter;

the drum is generally cylindrical and has an external diameter equal to the external diameter of the arbor and juxtaposed therewith;

the first helical spring has an internal diameter corresponding to said external diameters with convolutions thereof overlying the arbor and the drum, said convolutions following a helical path tending to radially contract said convolutions upon rotation of the drum in the direction toward said rest position of said drive means, in which direction the arbor and the drum will rotate concurrently and tending to radially dilate said convolutions upon rotation of the drum in the opposite direction from said rest position of the drive means to relax the grip of the first helical spring upon the drum and the arbor and permit rotation of the drum relative to the arbor;

the body of the tool includes a stationary, generally cylindrical boss coaxial with said arbor and having an external diameter equal to the external diameter of the arbor and juxtaposed therewith;

the second helical spring has an internal diameter corresponding to said external diameters with convolutions thereof overlying the arbor and the boss, said convolutions following a helical path tending to radially dilate said convolutions to permit rotation of the arbor by the drum relative to the boss in the direction in which the drum and the arbor will rotate concurrently and tending to radially contract said convolutions to grip the arbor and the boss and preclude rotation of the arbor in the opposite direction.

References Cited

UNITED STATES PATENTS

| | | | |
|---|---|---|---|
| 2,367,313 | 1/1945 | Reynolds | 197—84 X |
| 2,542,632 | 2/1951 | Melin | 197—83 X |
| 2,565,985 | 8/1951 | Norton et al. | 197—84 X |
| 2,742,830 | 4/1956 | Wirtz | 197—84 X |
| 2,873,013 | 2/1959 | Thiene et al. | |
| 2,954,861 | 10/1960 | Roggenstein et al. | 197—84 |
| 3,155,215 | 11/1964 | Avery | 197—6.7 |
| 3,225,886 | 12/1965 | Cetran et al. | 197—84 |
| 3,263,790 | 8/1966 | Bremer et al. | 197—6.7 |
| 3,277,992 | 10/1966 | Bremer | 197—6.7 |
| 3,283,876 | 11/1966 | Kern | 197—65 X |

ROBERT E. PULFREY, *Primary Examiner.*

E. S. BURR, *Examiner.*